(12) United States Patent
Gregg et al.

(10) Patent No.: US 8,032,708 B2
(45) Date of Patent: Oct. 4, 2011

(54) METHOD AND SYSTEM FOR CACHING DATA IN A STORGAE SYSTEM

(75) Inventors: Brendan D. Gregg, San Francisco, CA (US); Adam H. Leventhal, San Francisco, CA (US); Bryan M. Cantrill, Piedmont, CA (US)

(73) Assignee: Oracle America, Inc., Redwood City, CA (US)

( * ) Notice: Subject to any disclaimer, the term of this patent is extended or adjusted under 35 U.S.C. 154(b) by 354 days.

(21) Appl. No.: 12/369,486

(22) Filed: Feb. 11, 2009

(65) Prior Publication Data

US 2010/0205368 A1    Aug. 12, 2010

(51) Int. Cl.
*G06F 12/00* (2006.01)

(52) U.S. Cl. ........ 711/118; 711/103; 711/112; 711/133; 711/136; 711/159

(58) Field of Classification Search .................. None
See application file for complete search history.

*Primary Examiner* — Shawn X Gu
(74) *Attorney, Agent, or Firm* — Osha • Liang LLP

(57) ABSTRACT

A method for caching data in a storage system involves receiving a request for a first datum stored on a storage disk, retrieving the first datum from the storage disk when a copy of the first datum is not stored on an asymmetric cache device (ACD), storing a first copy of the first datum in a main memory, updating a list of data to include the first datum, storing, prior to any data being evicted from the main memory, a second copy of the first datum on the ACD, and evicting the first copy of the first datum from the main memory when a first copy of a second datum is designated for storing in the main memory and the main memory is full and the first datum is at the tail of the list of data.

20 Claims, 7 Drawing Sheets

| Accessed Data | Data In Main Memory | Data In Asymmetric Cache Device | Most Recently Used List for Data in Main Memory |
|---|---|---|---|
| | | Tail 400 ↓ | Head 402 ↓ |
| 1  A | A _ _ _ _ _ _ | _ _ _ _ _ _ _ _ _ | _ _ _ _ _ _ A |
| 2  B | A B _ _ _ _ _ | _ _ _ _ _ _ _ _ _ | _ _ _ _ _ A B |
| 3  E | A B E _ _ _ _ | _ _ _ _ _ _ _ _ _ | _ _ _ _ A B E |
| 4  L | A B E L _ _ _ | _ _ _ _ _ _ _ _ _ | _ _ _ A B E L |
| 5  B | A B E L _ _ _ | _ _ _ _ _ _ _ _ _ | _ _ _ A E L B |
| 6  C | A B E L C _ _ | _ _ _ _ _ _ _ _ _ | _ _ A E L B C |
| 7  A | A B E L C _ _ | _ _ _ _ _ _ _ _ _ | _ _ E L B C A |
| 8  Z | A B E L C Z _ | _ _ _ _ _ _ _ _ _ | _ E L B C A Z |
| 9  D | A B E L C Z D | _ _ _ _ _ _ _ _ _ | E L B C A Z D |
| 10  A | A B E L C Z D | _ _ _ _ _ _ _ _ _ | E L B C Z D A |
| 11  F | A B L C Z D F | E _ _ _ _ _ _ _ _ | L B C Z D A F |
| 12  C | A B L C Z D F | E _ _ _ _ _ _ _ _ | L B Z D A F C |
| 13  M | A B C Z D F M | E L _ _ _ _ _ _ _ | B Z D A F C M |
| 14  P | A C Z D F M P | E L B _ _ _ _ _ _ | Z D A F C M P |
| 15  B | A C D F M P B | E L B Z _ _ _ _ _ | D A F C M P B |
| 16  X | A C F M P B X | E L B Z D _ _ _ _ | A F C M P B X |
| 17  N | C F M P B X N | E L B Z D A _ _ _ | F C M P B X N |
| 18  Y | C M P B X N Y | E L B Z D A F _ _ | C M P B X N Y |
| 19  C | C M P B X N Y | E L B Z D A F _ _ | M P B X N Y C |
| 20  A | C P B X N Y A | E L B Z D A F M _ | P B X N Y C A |
| 21  R | C B X N Y A R | E L B Z D A F M P _ | B X N Y C A R |
| 22  K | C X N Y A R K | E L B Z D A F M P _ | X N Y C A R K |
| 23  M | C N Y A R K M | E L B Z D A F M P X | N Y C A R K M |
| 24  S | C Y A R K M S | L B Z D A F M P X N | Y C A R K M S |
| 25  T | C A R K M S T | B Z D A F M P X N Y | C A R K M S T |

FIGURE 4

| | Accessed Data | Data In Main Memory | Data In Asymmetric Cache Device | Most Recently Used List for Data in Main Memory |
|---|---|---|---|---|
| | | | Tail 500 | Head 502 |
| 1 | A | A _ _ _ _ _ _ | _ _ _ _ _ _ _ _ _ _ | _ _ _ _ _ _ A |
| 2 | B | A B _ _ _ _ _ | _ _ _ _ _ _ _ _ _ _ | _ _ _ _ _ A B |
| 3 | SEARCH | A B _ _ _ _ _ | A B _ _ _ _ _ _ _ _ | _ _ _ _ _ A B |
| 4 | E | A B E _ _ _ _ | A B _ _ _ _ _ _ _ _ | _ _ _ _ A B E |
| 5 | L | A B E L _ _ _ | A B _ _ _ _ _ _ _ _ | _ _ _ A B E L |
| 6 | SEARCH | A B E L _ _ _ | A B E L _ _ _ _ _ _ | _ _ _ A B E L |
| 7 | B | A B E L _ _ _ | A B E L _ _ _ _ _ _ | _ _ _ A E L B |
| 8 | C | A B E L C _ _ | A B E L _ _ _ _ _ _ | _ _ A E L B C |
| 9 | SEARCH | A B E L C _ _ | A B E L C _ _ _ _ _ | _ _ A E L B C |
| 10 | A | A B E L C _ _ | A B E L C _ _ _ _ _ | _ _ E L B C A |
| 11 | Z | A B E L C Z _ | A B E L C _ _ _ _ _ | _ E L B C A Z |
| 12 | SEARCH | A B E L C Z _ | A B E L C Z _ _ _ _ | _ E L B C A Z |
| 13 | D | A B E L C Z D | A B E L C Z _ _ _ _ | E L B C A Z D |
| 14 | A | A B E L C Z D | A B E L C Z _ _ _ _ | E L B C Z D A |
| 15 | SEARCH | A B E L C Z D | A B E L C Z _ _ _ _ | E L B C Z D A |
| 16 | F | A B L C Z D F | A B E L C Z _ _ _ _ | L B C Z D A F |
| 17 | C | A B L C Z D F | A B E L C Z _ _ _ _ | L B Z D A F C |
| 18 | M | A B C Z D F M | A B E L C Z _ _ _ _ | B Z D A F C M |
| 19 | P | A C Z D F M P | A B E L C Z _ _ _ _ | Z D A F C M P |
| 20 | B | A C D F M P B | A B E L C Z _ _ _ _ | D A F C M P B |
| 21 | X | A C F M P B X | A B E L C Z _ _ _ _ | A F C M P B X |
| 22 | N | C F M P B X N | A B E L C Z _ _ _ _ | F C M P B X N |
| 23 | Y | C M P B X N Y | A B E L C Z _ _ _ _ | C M P B X N Y |
| 24 | C | C M P B X N Y | A B E L C Z _ _ _ _ | M P B X N Y C |
| 25 | A | C P B X N Y A | A B E L C Z _ _ _ _ | P B X N Y C A |
| 26 | SEARCH | C P B X N Y A | A B E L C Z P X _ _ | P B X N Y C A |
| 27 | R | C B X N Y A R | A B E L C Z P X _ _ | B X N Y C A R |
| 28 | K | C X N Y A R K | A B E L C Z P X _ _ | X N Y C A R K |
| 29 | SEARCH | C X N Y A R K | A B E L C Z P X N Y | X N Y C A R K |
| 30 | M | C N Y A R K M | A B E L C Z P X N Y | N Y C A R K M |
| 31 | S | C Y A R K M S | A B E L C Z P X N Y | Y C A R K M S |
| 32 | SEARCH | C Y A R K M S | B E L C Z P X N Y R | Y C A R K M S |
| 33 | T | C A R K M S T | B E L C Z P X N Y R | C A R K M S T |

FIGURE 5

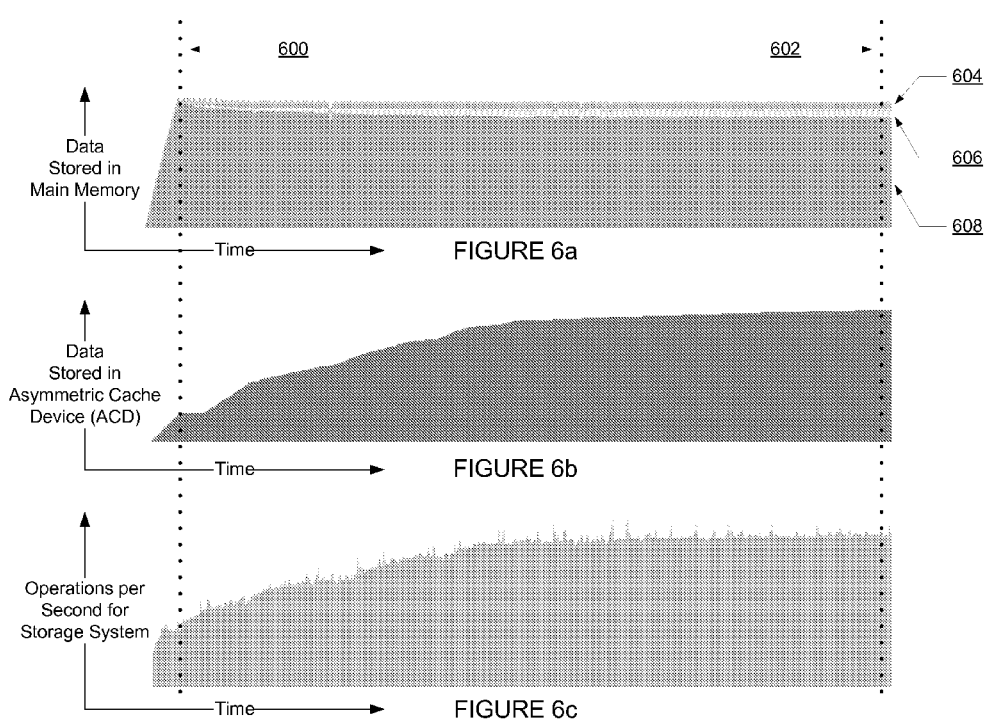

under the table # METHOD AND SYSTEM FOR CACHING DATA IN A STORGAE SYSTEM

BACKGROUND

A typical operating system includes a file system. The file system provides a mechanism for the storage and retrieval of files. An application operating, either locally or remotely, on a computer system uses files as an abstraction to address data. Conventionally, this data is stored on a non-volatile storage disk.

In order to decrease the time required to read a file from the non-volatile storage device, copies of recently accessed files are cached in main memory. Thus, when a request to read a file is received, the file system may first query main memory to determine whether a copy of the file is cached. If the file is not cached in main memory, the file system may next query any auxiliary cache devices. As the time for retrieval from either main memory or an auxiliary cache device is significantly less than the time for retrieval from the non-volatile storage disk, the file is read from a cached copy in main memory or an auxiliary cache device, if possible, before it is retrieved from the non-volatile storage disk. Accordingly, for data caching to be truly effective in a storage system, data likely to be requested again in the near future should be accessible by virtue of a cached copy to gain the benefit of a reduced retrieval time.

While an ideal solution would allow for the caching and hence expedited retrieval of any and all data previously referenced by a storage system, this is not realistic. For instance, there is a price disparity between the dynamic random access memory (DRAM) solid state devices (SSD) used in implementing main memory and the flash SSDs used in implementing auxiliary cache devices. Accordingly, storage systems can incorporate a flash-implemented auxiliary cache with a DRAM-implemented main memory to strike a balance between performance and cost.

In view of using a hybridized storage system, an effective data caching policy must account for differentiable read and write performances among the two cache implementations. For instance, flash SSDs, while more affordable than DRAM SSDs, are essentially read-biased and therefore take longer to process a write request than to process a read request. As such, scenarios calling for frequent write operations to flash SSDs may result in a system bottleneck.

SUMMARY

In general, in one aspect, the invention relates to a method for caching data in a storage system. The method includes receiving a request for a datum stored on a storage disk. The method further includes retrieving the datum from the storage disk when a copy of the datum is not stored in a main memory and when a copy of the datum is not stored on an asymmetric cache device (ACD). The method further includes storing a first copy of the datum in the main memory. The method further includes updating a list of data to include the datum, where each datum in the list of data is a datum for which a copy is stored in the main memory, and where the list of data is sorted using a scheme such that a datum at a head of the list of data is most favored by the scheme and a datum at a tail of the list of data is least favored by the scheme. The method further includes storing, prior to any data being evicted from the main memory, a second copy of the datum on the ACD, where the datum is one of a plurality of data selected using a head-first search of the list of data. The method further includes evicting the first copy of the datum from the main memory when a copy of a different datum is designated for storing in the main memory, the main memory is full, and the datum being evicted is at the tail of the list of data.

In general, in one aspect, the invention relates to a system for caching data in a storage system. The system includes a main memory, an ACD, and a storage disk. The system is configured to receive a request for a datum stored on a storage disk. The system is further configured to The system is further configured to retrieve the datum from the storage disk when a copy of the datum is not stored in a main memory and when a copy of the datum is not stored on an ACD. The system is further configured to store a first copy of the datum in the main memory. The system is further configured to update a list of data to include the datum, where each datum in the list of data is a datum for which a copy is stored in the main memory, and where the list of data is sorted using a scheme such that a datum at a head of the list of data is most favored by the scheme and a datum at a tail of the list of data is least favored by the scheme. The system is further configured to store, prior to any data being evicted from the main memory, a second copy of the datum on the ACD, where the datum is one of a plurality of data selected using a head-first search of the list of data. The system is further configured to evict the first copy of the datum from the main memory when a copy of a different datum is designated for storing in the main memory, the main memory is full, and the first datum is at the tail of the list of data.

In general, in one aspect, the invention relates to computer readable medium comprising executable instructions for caching data in a storage system, wherein executable instructions comprise instructions to: receive a request for a datum stored on a storage disk; retrieve the datum from the storage disk when a copy of the datum is not stored in a main memory and when a copy of the datum is not stored on an ACD; store a first copy of the datum in the main memory; update a list of data to include the datum, where each datum in the list of data is a datum for which a copy is stored in the main memory, and where the list of data is sorted using a scheme such that a datum at a head of the list of data is most favored by the scheme and a datum at a tail of the list of data is least favored by the scheme; store, prior to any data being evicted from the main memory, a second copy of the datum on the ACD, where the datum is one of a plurality of data selected using a head-first search of the list of data; and evict the first copy of the datum from the main memory when a copy of a different datum is designated for storing in the main memory, the main memory is full, and the datum being evicted is at the tail of the list of data.

Other aspects of the invention will be apparent from the following description and the appended claims.

BRIEF DESCRIPTION OF DRAWINGS

FIGS. 4 and 5 show how data is cached in accordance with one or more embodiments of the invention.

FIGS. 6a-6c show graphs detailing performance aspects in accordance with one or more embodiments of the invention.

DETAILED DESCRIPTION

Figure 1:
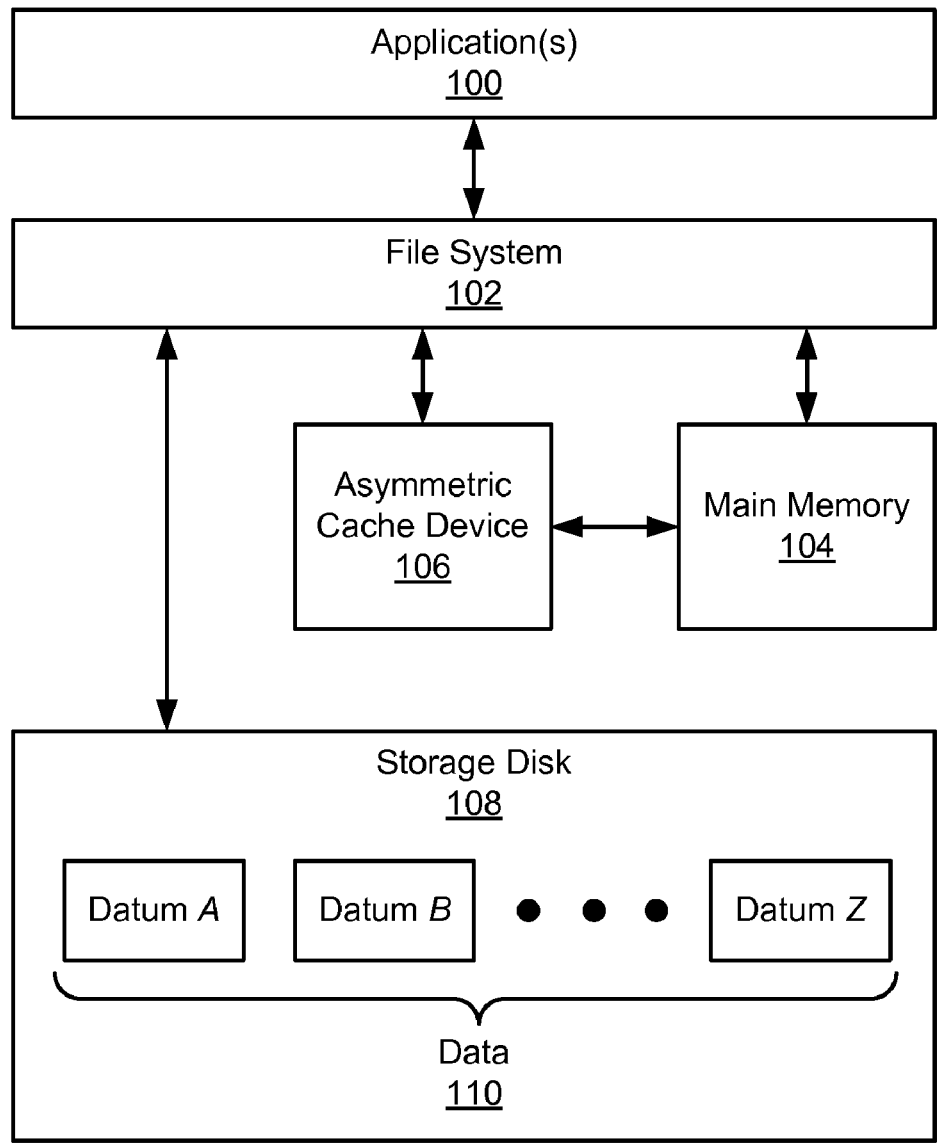
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and method for caching data in a storage system. More specifically, embodiments of the invention are directed to copying a datum that is stored in main memory to an asymmetric cache device (ACD) before the datum is evicted from main memory. In such instances, the datum is said to be copied ahead of the eviction. Further, embodiments of the invention are directed to populating the ACD with data by the time main memory reaches full capacity as opposed to afterwards, such that the benefits of cached data are sooner realized by the system. The method for populating the cache may also be referred to as warming up the cache.

FIG. 1 shows a system in accordance with one or more embodiments of the invention. The system includes one or more applications (100) configured to request files from a file system (102). In one or more embodiments of the invention, the application(s) (100) may be, but are not limited to, local applications (e.g., user-level or kernel-level applications) and remote applications (i.e., applications executing on a system separate from the system on which the file system is executing) connected via a network and communication using a file or block sharing protocol (e.g., Server Message Block (SMB) protocol, Network File System (NFS) protocol, etc.). In one or more embodiments of the invention, the application(s) (100) interface with the file system (102) through an operating system interface (not shown). In one or more embodiments of the invention, the file system (102) is configured to receive requests for files from applications (100). The file system (102) converts requests for the files to requests for the data (e.g., data which makes up the file, etc.) corresponding to the file. The file system (102) (or another process) attempts to retrieve the data (110).

The file system (102) may obtain the data (110) from one or more of the following locations: (i) main memory (104), (ii) asymmetric cache devices (ACDs) (106), and (iii) one or more disks (108). In one embodiment of the invention, main memory (104) is random access memory (RAM). Main memory (104) is configured to store user data (e.g., files). In addition, main memory (104) is configured to maintain cache metadata and a usage data structure.

In one or more embodiments of the invention, the cache metadata tracks what data is stored in main memory (104) and what data is stored in the ACDs (106). In one or more embodiments of the invention, the cache metadata is implemented using one or more linked lists.

In one or more embodiments, the usage data structure tracks the frequency that each datum is requested. Further, the usage data structure may maintain a list (or equivalent data structure) that includes a listing of all data (or at least references to the data) in main memory (104) in, for example, least frequently requested order (or least recently requested order). Those skilled in the art will appreciate that the list may use any ordering scheme which allows the system to identify which data in main memory (104) is about to be evicted from (or is likely to evicted from) main memory. As a datum in main memory (104) is requested, the order of the datum on the list is updated accordingly.

In one or more embodiments of the invention, the cache metadata and/or usage data structure are located in main memory (104). In another embodiment of the invention, the cache metadata and/or usage data structure are located in another portion of the system (i.e., cache metadata and/or usage data structure are not located in main memory).

In one or more embodiments of the invention, each ACD (106) is configured to store data. In one or more embodiments of the invention, the ACD (106) does not store dirty content and the content of the ACD (106) is not flushed to disk (108). In one or more embodiments of the invention, each ACD (106) includes memory that is read-biased (i.e., the time for processing a read request is faster than the time for processing a write request). In one or more embodiments of the invention, at least one ACD (106) in the system includes flash-type memory. Examples of flash-type memory include, but are not limited, non-volatile NOR-type memory and non-volatile NAND-type memory.

In one or more embodiments of the invention, each disk (108) in the system is configured to store data (110). In one or more embodiments of the invention, the disks (108) may include, but are not limited to, magnetic memory, optical memory, or any combination thereof. In one or more embodiments of the invention, the storage capacity of main memory (104) is less than the storage capacity of the ACD(s) (106), and the storage capacity of the ACD(s) (106) is less than the storage capacity of the disk(s) (108).

Figure 2:
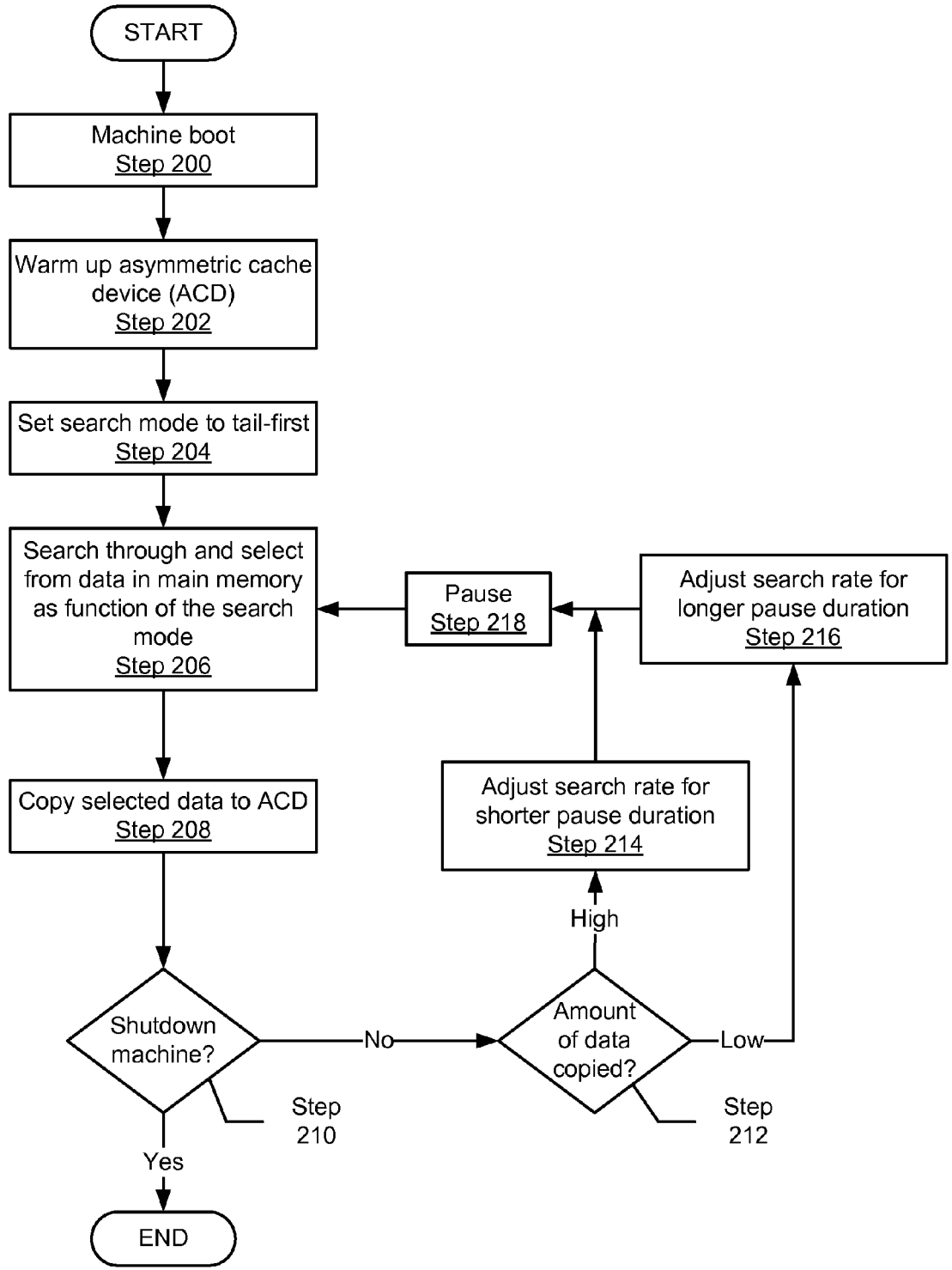
FIGS. 2 and 3 show flowcharts in accordance with one or more embodiments of the invention.
Figure 3:
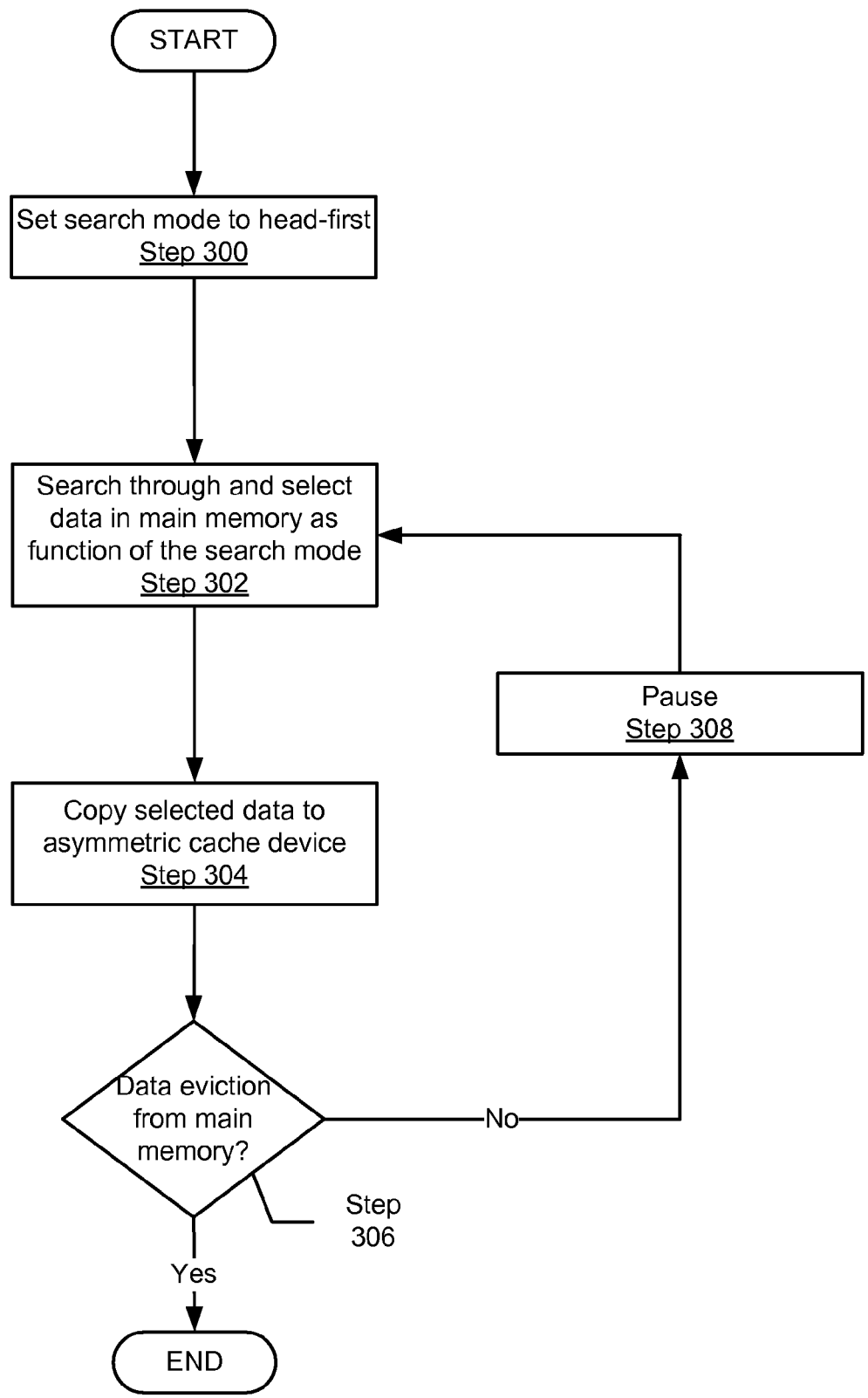

FIGS. 2 and 3 show flowcharts in accordance with one or more embodiments of the invention. While the various steps in these flowcharts are presented and described sequentially, one should appreciate that some or all of the steps may be executed in different orders, may be combined or omitted, and some or all of the steps may be executed in parallel. In addition, steps have been omitted to simplify the presentation. The process shown in FIG. 2 may be used, for example, to cache data in a storage system such as the one shown in FIG. 1.

In Step 200, a computer system is booted up. In one or more embodiments of the invention, main memory is empty or near-empty state when the computer system has just finished booting. Further, the ACD contains no cached data (i.e., the ACD is cold) and, as such, cannot provide support in responding to a request for a datum.

In Step 202, the ACD is warmed up quickly. Warming up the ACD will be discussed in greater detail later with relation to FIG. 3.

In Step 204, a tail-first search mode is determined for an ordered list of all data in main memory. As a function of having an ordering, the list has a head and a tail such that the head is the list item most favored by the scheme used to order the list and the tail is the list item least favored by the scheme. In view of this, a tail-first search mode enables a search to iterate through items of the list starting at the tail of the list and moving toward its head.

In one or more embodiments of the invention, the ordered list of all data in main memory is maintained as part of the usage data structure. In one or more embodiments of the invention, the list is maintained and ordered in accordance with a scheme allowing the system to identify which data in main memory is about to be evicted from (or is likely to evicted from) main memory. One example of such a scheme is a most recently used (MRU) scheme, where the datum at the head of the list is the datum that was most recently used by the system and the datum at the tail of the list is the datum least recently used by the system. Another example of a scheme is a most frequently used (MFU) scheme, where the datum at the head of the list is the datum that is most frequently used by the system and the datum at the tail of the list is the datum least frequently used by the system.

In Step 206, data is searched and selected from main memory as a function of the search mode. In one or more embodiments of the invention, in accordance with the tail-first search mode set in Step 204, the list of data stored in main memory is searched beginning with the datum at the tail of the list (the least recently used datum) and moving towards the head of the list (the most recently used datum). In one or more embodiments of the invention, the range of data searched through is limited by a maximum search length. As such, the range of searched-through data may be a subset of all data stored in main memory.

In one or more embodiments of the invention, a subset of data is selected from the searched-through data as a function of one or more selection criteria. The selection criteria used in evaluating whether a datum is a candidate for copying ahead to the ACD may include and is not limited to one or more of the following rules: (i) there must not already be a copy of the selected datum stored on the ACD; (ii) the selected datum must have a minimum age, where the minimum age threshold is a pre-defined value; and (iii) the selected data must be eligible for copying in view of any content type or file system type filters imposed by the storage system. In one or more embodiments of the invention, the subset of data that is selectable from the searched-through data is limited by both a minimum copy size and a maximum copy size. As such, the maximum copy size must be less than or equal to the maximum search length.

In one or more embodiments of the invention, the searching of and selecting from the ordered list of data stored in main memory are integrated processes such that the system will evaluate a first datum in the list of data as a function of the selection criteria before proceeding onwards to evaluate a second datum. By incorporating an in-place selection function into the list-iterative search, the system then has the ability to halt search at the moment the maximum copy size threshold is reached even if the maximum search length threshold has not been reached. For example, the search length may be 64 megabytes and the maximum copy size may be 16 megabytes. Accordingly, the search is completed at the earlier of 16 megabytes being identified for copying to the ACD or 64 megabytes of data on the list have been searched.

In Step 208, copies of the selected data are stored on the ACD. At the completion of this step, a datum that was selected in Step 206 is stored in both the main memory and on the ACD. As such, the datum is copied ahead to the ACD prior to its eviction from main memory.

In Step 210, for a determination is made about whether a machine shutdown request has been issued. If a shutdown request has been issued, then the process of FIG. 2 is terminated. If a shutdown request has not been issued, then the amount of data copied ahead to the ACD in Step 208 is evaluated in Step 212.

If the amount of data selected (in Step 206) and therefore copied ahead (in Step 208) is significant in comparison to the amount of data that was searched through (also Step 206), then a search rate is adjusted in Step 214 for a shorter pause duration between searches. Otherwise, if the amount of data copied ahead is not significant in comparison to the amount of data through, then a search rate is adjusted in Step 216 for a longer pause duration between searches.

In one or more embodiments of the invention, the determination of what amount of copied data is and is not significant with relation to the amount of searched-through data is defined in the system. For example, in one or more further embodiments of the invention, a range of percentages may be defined by in the system in support of making the determination and in evaluation of a data copied to data searched ratio.

The adjustment in the search rate for a shorter or longer pause duration (Steps 214 and 216 respectively) is made based on the evaluation of Step 212 and on how the amount of copied data compares to the amount of searched-through data. In one or more embodiments of the invention, the pause duration is set to defined long or short pause duration values. In one or more other embodiments of the invention, the pause duration is mapped to a value belonging to a range of pause duration values as a function of a data copied to data searched ratio. For example, if fifty percent or more of a defined maximum copy size is found eligible for copying ahead by a search, then a long pause duration value will be used for the subsequent search pause. Alternatively, if less than fifty percent of the defined maximum copy size is found eligible for copying ahead by the search, then a short pause duration value will be used for the subsequent search pause.

The following example depicting how the above algorithm may be used in one or more embodiments of the invention for determining search pause duration. For the purposes of these examples, assume the maximum copy size is defined as 8 MB. Further, a search may search up to 16 MB if necessary to find 8 MB to copy ahead. A first search is executed and finds 5 MB of data that is copy-ahead eligible out of the 16 MB of data that was searched. Because 5 MB is greater than fifty percent of the maximum copy size, i.e. 8 MB, a short pause duration value of 200 milliseconds is used for the subsequent search pause. Sometime later, a second search is executed. The second search finds only 1 MB of copy-ahead eligible data. Because 1 MB is less than fifty percent of the maximum copy size, a long pause duration value of 1 second is used for the subsequent search pause. The values used in these examples are merely for illustration and should not be construed as material limitations to the invention.

Returning to FIG. 2, the system pauses in Step 218 as a function of the adjusted search rate. Once the pause is over, the system proceeds to again search and select data stored in main memory as described in Step 206.

In one or more embodiments of the invention, the process of FIG. 2 allows the system to loop in the search/select/copy/pause sequence (Steps 206-218) so long as the machine is operative. In doing so, the process provides effective caching for the data storage system of the machine by copying ahead data to the ACD before the data is evicted from main memory.

The process shown in FIG. 3 may be used, for example, to warm up the ACD. In one or more embodiments of the invention, the process shown in FIG. 3 is used in performing Step 202 shown in FIG. 2.

In Step 300, a head-first search mode is determined for the ordered list of all data in main memory. The head-first search mode enables a search to iterate through items of the list starting at the head of the list and moving toward its tail.

In Step 302, data is searched and selected from main memory as a function of the search mode. Aside from the head-first search mode, the search and selection mechanism is similar to the one described above with relation to FIG. 2 having many of the same features: a maximum search length; datum selection criteria; a minimum copy size and a maximum copy size; and an in-place selection function incorporated into a list-iterative search.

In Step 304, copies of the selected data are stored on the ACD. At the completion of this step, a datum that was selected in Step 302 will be stored both in main memory and on the ACD. As such, the datum is copied ahead of the eviction.

In Step 306, a determination is made about whether any datum has been evicted from main memory. If a datum eviction has occurred, then the process of FIG. 3 is termination and the ACD warm up is finished. If no datum has been evicted from main memory, then the system pauses the warm up process in Step 308. In one or more embodiments of the invention, the pause duration used in the warm up process (as described in Step 308) is significantly shorter than any pause duration used after the warm up process (as considered and described in Steps 214-218). As such, the copy ahead functionality is accelerated during ACD warm up in comparison to copy ahead after the ACD is already warmed up. The adjustment in pause duration described here corresponds with previous discussions pertaining to Steps 214 and 216 shown in FIG. 2. Once the pause is over, the system proceeds to again search and select data stored in main memory as described in Step 302.

In one or more embodiments of the invention, the process of FIG. 3 allows the system to loop in the search/select/copy/pause sequence (Steps 302-308) so long as the system is in the warm up phase. Once a datum has been evicted from main memory, then the warm up phase is complete.

The following discussion is not intended to limit the scope of the invention. With respect to FIGS. 4 and 5, FIG. 4 is contrasted below with FIG. 5, which shows an implementation of one or more embodiments of the invention described above.

Turning to FIG. 4, FIG. 4 shows the caching of data in an ACD, where the ACD is not warmed up and data is not copied ahead. The first column ("Accessed Data") represents data that has been accessed. For purposes of simplifying this example, each datum is assigned an alphabetical letter and is assumed to be 8 KB. The second column ("Data In Main Memory") represents the contents of main memory after the datum access of the first column. The third column ("Data In Asymmetric Cache Device") represents the contents of the ACD. For purposes of this example, main memory is limited to a seven datum storage capacity and the ACD is limited to a ten datum storage capacity. The fourth and last column ("Most Recently Used List for Data in Main Memory") represents the ordered list of data maintained in accordance with the data stored in main memory. For the purposes of this example, the list of data is ordered according to a most recently used scheme that provides for a head (402) and a tail (400) for the list such that the datum at the head is the datum most favored by the scheme and the datum at the tail is the datum least favored by the scheme. As such, in this particular example, the datum at the head is the datum most recently used (i.e., most recently accessed) and the datum at the tail is the datum least recently used (i.e., least recently accessed).

It should be noted that MRU scheme in the example is provided as just one example of a list ordering scheme and is not meant in any way as a limitation to the invention. In one or more embodiments of the invention, a MFU scheme may be used as the list ordering scheme. In one or more other embodiments of the invention, other list ordering schemes are used such that they aid to identify which data in main memory is about to be evicted from (or is likely to evicted from) main memory.

Returning to FIG. 4, the first accessed datum is 'A.' Before this datum access, both main memory and the ACD are empty. The most recently used list for data stored in main memory is likewise empty. In response to receiving an access to request 'A,' the 'A' datum is retrieved from a storage disk and stored into main memory. Accordingly, the most recently used list is updated to represent the storage of 'A' in main memory. Because 'A' is the only datum written into main memory at this point, it is at both the head and tail of the most recently used list.

As shown in the second through fourth rows of FIG. 4, data for 'B', 'E', and 'L' are subsequently requested, retrieved from the storage disk, and stored into main memory. As each datum is a datum that is newly-stored in main memory, the most recently used list is updated appropriately to reflect a new head datum in each instance.

In the fifth row of FIG. 4, the 'B' datum is requested for a second time. While this does not require a retrieval from the storage disk and a storage into main memory, it does require an updating of the most recently used list. Accordingly, datum 'B' moves from the position in the list that is second from the tail to the head position in the list. A similar update takes place in the seventh row of FIG. 4 where the 'A' datum is again requested resulting in datum 'A' moving from the tail to the head of the most recently used list.

The storage of datum 'D' in the ninth row of FIG. 4 effectively fills main memory to its full capacity. As a result, the request for datum 'F' in the eleventh row requires an eviction of the least recently used datum from main memory. The most recently used list at the time of the datum 'F' request is provided in the row above: E-L-B-C-Z-D-A. As such, datum 'E' is at the tail of the list and is therefore the candidate for eviction from main memory. Accordingly, datum 'E' must first be copied to the ACD before being evicted from main memory. Only after copying and evicting datum 'E', can the system store datum 'F' in main memory. Finally, the most recently used list is updated to reflect the eviction of datum 'E' and the storage of datum 'F' into main memory: L-B-C-Z-D-A-F.

As seen in the ninth through the twenty-fifth rows of FIG. 4, main memory is and remains full. Subsequent requests for data 'M', 'P', 'B', 'X', 'N', 'Y', 'A', 'R', 'K', 'M', 'S', and 'T' each result in the execution of the copy/evict/store sequence described above as the system routinely evicts the least recently used datum from main memory as evidenced in the FIG. 4 fourth column to make room for the requested datum.

FIG. 5 shows how data is cached in one or more embodiments of the invention. In particular, FIG. 5 illustrates the warming up of the ACD and how data is copied ahead before eviction of the data from main memory. In illustrating the effect of the described features of the invention, FIG. 5 shows access of the same data in the same sequence as exhibited in FIG. 4. However, the resulting content of the main memory and the ACD is different when compared with FIG. 4.

Turning to FIG. 5, the step of searching through and selecting data for copying ahead to the ACD is signified in FIG. 5 by the entry of "(search)" in the first column in lieu of specifying an accessed datum (i.e., see rows 3, 6, 9, 12, 15, 20, 27, and 32). As in FIG. 4, the system uses a most recently used list to order the data stored in main memory. Also as in FIG. 4, assume each datum is 8 KB. Further, assume: (i) a maximum search length of 32 KB for searching the most recently used list; (ii) a maximum copy length of 16 KB for copying ahead data to the ACD; and (iii) a sole selection criteria that denies datum selection if the datum is already copied to the ACD.

Before the first datum access of the first row the ACD is initially empty. To warm up the ACD, the system makes two significant adjustments. The search rate for the most recently used list is accelerated during warm up, as reflected in a pause duration that is brief in comparison to the pause durations employed in a non-warm up context. In addition, the search mode for the most recently used list is set to head-first, whereas the search mode normally defaults to tail-first in a non-warm up context.

In illustrating warm up adjustments and how data caching is achieved in one or more embodiments of the invention, it is instructive to examine how data is requested and cached row by row as shown in FIG. 5.

In the first and second rows respectively, data 'A' and 'B' are requested and stored upon their retrieval into main memory. Because the search function has not yet executed for the first time, the ACD is still empty. However, the most recently used list has been updated to account for the storage of datum 'A' and datum 'B' in the main memory. The third row shows the first execution of the data search and selection step. Because the system is warming up the ACD at this point, the search is executed head-first. The search function begins with datum 'B' at the head of the most recently used list. As datum 'B' is not already stored on the ACD, datum 'B' is selected for copying ahead by the system. The search function iterates onwards to the next, and in this case last, datum in the most recently used list: datum 'A.' As datum 'A' is not already stored on the ACD, datum 'A' is also selected for copying ahead by the system. Because data 'A' and 'B' together occupy 16 KB, the maximum copy length has been reached (though the maximum search length has not) and, accordingly, the list search is halted. The copying ahead of data 'A' and 'B' is signified in the third row by simultaneous storage of data 'A' and 'B' in the ACD (third column) and in main memory (first column).

This entire sequence is repeated, as shown in rows 4-6 of FIG. 5, when data 'E' and 'L' are requested. In processing the request, the system stores each requested datum in main memory upon their retrieval. The most recently used list is updated in each case to reflect each datum. A search and select function is executed on the most recently used list, which now contains from tail to head A-B-E-L. Because the ACD is still being warmed up at this point, the search and select is executed beginning at the head of the most recently used list and moving toward the tail. As such, first datum 'L' and then datum 'E' are selected by the system for copying ahead to the ACD. Lastly, the selected data is copied ahead to the ACD.

The seventh row shows an example of a re-requested datum. In this instance because datum 'B' is already a resident in main memory, it does not require retrieval from storage. Rather, the only effect is an update of the most recently used list to move datum 'B' to the head of the list. The eighth row shows the request for datum 'C,' which must be retrieved from the storage disk as it is not cached in main memory or the ACD. The search and select function, shown in the ninth row, begins from the head of the most recently used list (tail to head: A-E-L-B-C). As such, datum 'C' is the first to be evaluated due to its position at the head of the list. Datum 'C' is selected by the system for copying ahead because it meets the selection criteria of not having already been copied to the ACD. The system then iterates down toward the tail of the list resulting in the evaluation of data 'B', 'L', and 'E', none of which is selected for copy ahead due to the fact that each datum is already stored on the ACD. Further, the system never iterates past 'E' to evaluate 'A' because the maximum search length of 32 KB limits the search to four datum in this example.

The request for, retrieval, and main memory storage of datum 'D' in the thirteenth row fills main memory to its maximum seven-datum capacity. As such, the next request, retrieval, and main memory storage for a new (i.e., not currently cached) datum results in the eviction of a datum from main memory. This happens in the sixteenth row with the request for datum 'F.' At the time of this request, the most recently used list is E-L-B-C-Z-D-A (reading from tail to head), which makes datum 'E' the next candidate for eviction from main memory. As the datum is already cached in the ACD by virtue of the copy ahead mechanism, there is no need for the system to do anything other than evict the datum from main memory (in contrast, the system of FIG. 4 may perform the copy to ACD at this time before performing the actual eviction function).

After the first datum eviction from main memory, the ACD warm up is complete. As such, the warm up adjustments are halted and the system returns to default operation: (i) the search rate for searching the most recently used list is adjusted such that the pause duration is longer than the one employed during ACD warm up; and (ii) the search mode for the most recently used list is set to tail-first. The adjusted search rate is evidenced in FIG. 5 when comparing the frequency of data search and selection steps before and after the first datum eviction from main memory (i.e., sixteenth row). The tail-first search mode is evident in the search and select operation and subsequent copying ahead of the fifteenth, twenty-sixth, twenty-ninth, and thirty-second rows. For instance, the search and select function shown in the fifteenth, row begins from the tail of the most recently used list (tail to head: E-L-B-C-Z-D-A). As such, datum 'E' is evaluated but not selected for copy ahead as a function of the datum already being stored on the ACD and therefore not being eligible in view of the selection criteria. Data 'L' and 'B', in that order respectively, are evaluated and are not selected by the system for the same underlying reason. As the system has now searched through 24 KB of data, it is permitted to search and evaluate one more datum before reaching the maximum search length. The final datum, 'C', is evaluated and also determined to be ineligible for copy in view of the fact that it is also currently cached in the ACD. Accordingly, no data is copied ahead to the ACD as a result of the search and select function of the fifteenth row.

Because the caching method implemented in one or more embodiments of the invention is adaptive in nature, the system evaluates the copy ahead performance of the data caching in determining when to perform the next search and select function. For example, the system will consider that 32 KB of data were searched through in the search and selection function of the fifteenth row with a result of not finding a single datum eligible for copying ahead. In recognition of this relative inefficiency and the resource-intensive nature of searching the most recently used list, the system may adjust the search rate to incorporate a longer pause before the next search and select function. Accordingly, the search and select function that is next in time is shown in the twenty-sixth row of FIG. 5 and therefore reflects an increased inter-search interval than was previously used by the system.

Conversely, the system may make an adjustment to the search rate for purposes of decreasing a pause duration between subsequent search and selection operations. This is evident by a comparison of the inter-search interval discussed above with the intervals between the search and selection operations of the twenty-sixth, twenty-ninth, and thirty-second rows. These latter search and selection operations, as shown, are more successful in finding eligible data for copying ahead. Accordingly, the inter-search intervals are significantly less than the previously-discussed interval.

FIG. 5 also shows how in certain cases a datum that has been accessed and subsequently stored in main memory may never be copied ahead. Datum 'F,' for example, is accessed and stored in main memory as shown in row 16. As such, it is positioned at that time as the head of the most recently used list. Because the ACD is operating at the time under a long search pause duration and further because datum 'F' is never accessed again during the pause duration, datum 'F' is evicted (in row 23) before the next search is performed (in row 26).

The same is true for Datum 'M,' which is accessed and stored in row 18 and later evicted in row 25 before the next search is performed.

In view of the above, warming up the ACD by copying ahead of datum before eviction from main memory may contribute to an improved storage system. This is particularly the case in storage systems that are implemented completely or at least in part using read-biased asymmetric storage devices.

As an example, consider the request for datum 'F' in the eleventh row of FIG. 4. At the time of this request, main memory is fully occupied and the requested datum is not one of the data stored in main memory. Accordingly, an eviction of the least recently used datum is necessary to store the requested datum. In doing so, the least recently used datum, 'E', must first be written to the ACD before it can be evicted from main memory. Once datum 'E' is evicted, then datum 'F' can be stored in main memory. Because the ACD is read-biased, the writing of datum 'E' in this sequence is the most costly operation with regards to time. In view of this, the main memory operations that evict datum 'E' and write datum 'F' are essentially waiting on the ACD write operation datum of 'E.' Further, as main memory remains full from the eleventh row onward in FIG. 4, this costly-in-time sequence is repeated with each request for a datum that is not stored in main memory.

In contrast, consider any of the requests for a datum in FIG. 5 after the thirteenth row when main memory becomes fully occupied. The eviction of datum 'E' in the sixteenth row, for example, does not wait upon the writing of datum 'E' to the ACD since it has already been copied ahead of time. As such, the system can evict datum 'E' and store datum 'F' without waiting upon the completion of a write operation at the ACD.

FIGS. 6a-6c show graphs detailing performance aspects in accordance with one or more embodiments of the invention. Time is the common independent variable operative in each graph and, as such, can be used to show how the storage of data in a main memory, the storage of data in an ACD, and the performance of an overall storage system incorporating both the main memory and the ACD are all tied together. Specifically, two specific points in time (600, 602) are discussed.

FIG. 6a shows the amount of data stored in main memory as a function of time. When a computer system using one or more embodiments of the invention first boots up, there is no data stored in main memory. In time, as both user and kernel level applications request the retrieval of data from the persistent storage devices in the system, main memory becomes increasingly occupied. As such, the graph of FIG. 6a initially begins by exhibiting a steep initial climb until it reaches a time (600) at which the amount of data stored in main memory approaches the main memory storage capacity. Once this storage capacity has been reached, the amount of data stored in main memory is maintained at or near that capacity level to maximize the performance benefits associated with data retrieval from the DRAM cache. For this reason, the amount of data stored in main memory is shown to plateau at time 600 in the graph of FIG. 6a.

FIG. 6b shows the amount of data stored in an ACD as a function of time. Initially, the ACD is being warmed up and, as such, is populated with copied-ahead data from main memory at an accelerated rate using a head-first search of main memory data. As the datum at the head of a most recently used or most frequently used list is generally the most freshly-cached datum in main memory, the copy-ahead mechanism is efficient during ACD warm up and results in the amount of data stored in the ACD quickly increasing. For this reason, FIG. 6b exhibits a steep initial climb.

However, the copy-ahead mechanism switches to a tail-first search once main memory has reached its storage capacity and data eviction begins (at time 600, as shown in FIG. 6a). Because the main memory data presently found at the tail of the ordered search lists has already been copied-ahead to the ACD, the copy-ahead mechanism does not find new data to copy ahead until the main memory data sitting at the head of the lists at time 600 reaches the tail at a later time. As such, the amount of data stored in the ACD momentarily plateaus as shown in FIG. 6b just after time 600. From this time forward, the search rate for copying ahead main memory data is lessened from the accelerated rate used during ACD warm up to one that is less frequent. Further, as more data is copied ahead to the ACD, the ACD also approaches or reaches its storage capacity. For these reasons, the graph of FIG. 6b gradually acclimates to a more shallow climb in the time following ACD warm up.

FIG. 6c shows the operations per second for the overall storage system, including both main memory and ACD storage, as a function of time. The important trend to take away from FIG. 6c, in relation to FIG. 6a and FIG. 6b, is the 2×-3× increase in the operations per second performance metric for the overall storage system from an earlier time 600 (when main memory has reached capacity and the ACD is being warmed up hence not yet provided any performance benefit) to a later time 602 (when the ACD is populated to its capacity via the copy ahead mechanism). With time, the ACD has been warmed up and fully utilized to an extent such that the performance of the overall storage system has improved drastically. This is contrary to the bottleneck situation encountered in a system that neglects to warm up an ACD by copying ahead data, where the storage of each newly-requested and newly-retrieved datum waits on the completion of an eviction of the most stale datum from main memory to an ACD.

Figure 7:
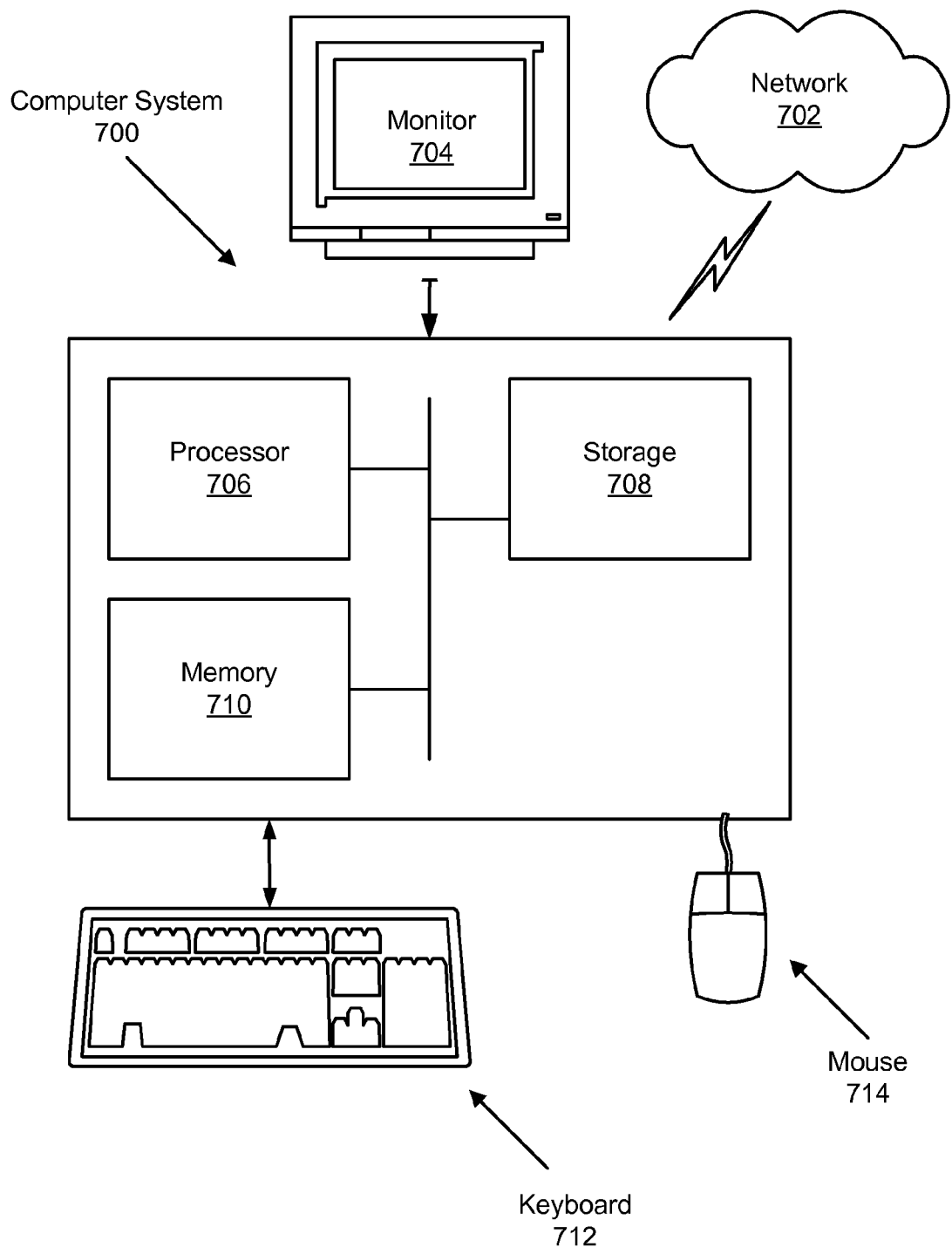
FIG. 7 shows a computer system in accordance with one or more embodiments of the invention.

Embodiments of the invention may be implemented on virtually any type of computer regardless of the platform being used. For example, as shown in FIG. 7, a computer system (700) includes one or more processors (706), associated memory (710) (e.g., random access memory (RAM), cache memory, flash memory, etc.), a storage device (708) (e.g., a hard disk, an optical drive such as a compact disk drive or digital video disk (DVD) drive, a flash memory stick, etc.), and numerous other elements and functionalities typical of today's computers (not shown). The computer (700) may also include input means, such as a keyboard (712), a mouse (714), or a microphone (not shown). Further, the computer (700) may include output means, such as a monitor (704) (e.g., a liquid crystal display (LCD), a plasma display, or cathode ray tube (CRT) monitor). The computer system (700) may be connected to a network (702) (e.g., a local area network (LAN), a wide area network (WAN) such as the Internet, or any other similar type of network) via a network interface connection (not shown). Those skilled in the art will appreciate that many different types of computer systems exist, and the aforementioned input and output means may take other forms. Generally speaking, the computer system (700) includes at least the minimal processing, input, and/or output means necessary to practice embodiments of the invention.

Further, those skilled in the art will appreciate that one or more elements of the aforementioned computer system (700) may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for caching data in a storage system, comprising:
   receiving a request for a first datum stored on a storage disk;
   retrieving the first datum from the storage disk when a copy of the first datum is not stored in a main memory and when a copy of the first datum is not stored on an asymmetric cache device (ACD);
   storing a first copy of the first datum in the main memory;
   updating a list of data to include the first datum, wherein each datum in the list of data is a datum for which a copy is stored in the main memory, wherein the list of data is sorted using a scheme such that a datum at a head of the list of data is most favored by the scheme and a datum at a tail of the list of data is least favored by the scheme;
   storing, prior to any data being evicted from the main memory, a second copy of the first datum on the ACD, wherein the first datum is one of a first plurality of data selected using a head-first search of the list of data; and
   evicting the first copy of the first datum from the main memory when a first copy of a second datum is designated for storing in the main memory and the main memory is full and the first datum is at the tail of the list of data.

2. The method of claim 1, further comprising:
   selecting a second plurality of data using a tail-first search of the list of data;
   selecting a third datum from the second plurality of data based on a selection criteria; and
   storing a first copy of the third datum on the ACD.

3. The method of claim 2, wherein selecting the second plurality of data using the tail-first search of the list of data is restricted to a maximum search length.

4. The method of claim 1, wherein the head-first search of the list of data is restricted to a maximum search length.

5. The method of claim 1, wherein the scheme used to sort the list of data is a most recently used scheme.

6. The method of claim 1, wherein the scheme used to sort the list of data is a most frequently used scheme.

7. The method of claim 1, wherein the ACD comprises flash-type memory.

8. A system, comprising:
   a main memory;
   an asymmetric cache device (ACD); and
   a storage disk,
   wherein the system is configured to:
      receive a request for a first datum stored on the storage disk;
      retrieve the first datum from the storage disk when a copy of the first datum is not stored in the main memory and when a copy of the first datum is not stored on the ACD;
      store a first copy of the first datum in the main memory;
      update a list of data to include the first datum, wherein each datum in the list of data is a datum for which a copy is stored in the main memory, wherein the list of data is sorted using a scheme such that a datum at a head of the list of data is most favored by the scheme and a datum at a tail of the list of data is least favored by the scheme;
      store, prior to any data being evicted from the main memory, a second copy of the first datum on the ACD, wherein the first datum is one of a first plurality of data selected using a head-first search of the list of data; and
      evict the first copy of the first datum from the main memory when a first copy of a second datum is designated for storing in the main memory and the main memory is full and the first datum is at the tail of the list of data.

9. The system of claim 8, further configured to:
   select a second plurality of data using a tail-first search of the list of data;
   select a third datum from the second plurality of data based on a selection criteria; and
   store a first copy of the third datum on the ACD.

10. The system of claim 9, wherein the tail-first search of the list of data is restricted to a maximum search length.

11. The system of claim 8, wherein the head-first search of the list of data is restricted to a maximum search length.

12. The system of claim 8, wherein the scheme used to sort the list of data is a most recently used scheme.

13. The system of claim 8, wherein the scheme used to sort the list of data is a most frequently used scheme.

14. The system of claim 8, wherein the ACD comprises flash-type memory.

15. A computer readable medium comprising executable instructions for caching data in a storage system, wherein executable instructions comprise instructions to:
   receive a request for a first datum stored on a storage disk;
   retrieve the first datum from the storage disk when a copy of the first datum is not stored in a main memory and when a copy of the first datum is not stored on an asymmetric cache device (ACD);
   store a first copy of the first datum in the main memory;
   update a list of data to include the first datum, wherein each datum in the list of data is a datum for which a copy is stored in the main memory, wherein the list of data is sorted using a scheme such that a datum at a head of the list of data is most favored by the scheme and a datum at a tail of the list of data is least favored by the scheme;
   store, prior to any data being evicted from the main memory, a second copy of the first datum on the ACD, wherein the first datum is one of a first plurality of data selected using a head-first search of the list of data; and
   evict the first copy of the first datum from the main memory when a first copy of a second datum is designated for storing in the main memory and the main memory is full and the first datum is at the tail of the list of data.

16. The computer readable medium of claim 15, further comprising executable instructions to:
   select a second plurality of data using a tail-first search of the list of data;
   select a third datum from the second plurality of data based on a selection criteria; and
   store a first copy of the third datum on the ACD.

17. The computer readable medium of claim 16, wherein the tail-first search of the list of data is restricted to a maximum search length, and wherein the head-first search of the list of data is restricted to the maximum search length.

18. The computer readable medium of claim 15, wherein the scheme used to sort the list of data is a most recently used scheme.

19. The computer readable medium of claim 15, wherein the scheme used to sort the list of data is a most frequently used scheme.

20. The computer readable medium of claim 15, wherein the ACD comprises flash-type memory.

* * * * *